(12) United States Patent
Wu et al.

(10) Patent No.: US 8,953,449 B2
(45) Date of Patent: Feb. 10, 2015

(54) VIRTUAL SUBPORT DATA TRAFFIC MANAGEMENT

(75) Inventors: Guoliang Wu, Plano, TX (US);
Maitreya Mukhopadhyay, Allen, TX (US); Melvin Tan, Richardson, TX (US); D. Michael Colven, Dallas, TX (US); Hari Hara Prasad Muthulingam, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 13/427,029

(22) Filed: Mar. 22, 2012

(65) Prior Publication Data

US 2013/0250961 A1     Sep. 26, 2013

(51) Int. Cl.
*H04J 1/16*     (2006.01)

(52) U.S. Cl.
USPC ........... 370/235; 370/412; 370/415; 370/429; 370/468

(58) Field of Classification Search
USPC .......................... 370/235, 412, 415, 429, 468
See application file for complete search history.

(56) References Cited

U.S. PATENT DOCUMENTS

| | | | |
|---|---|---|---|
| 6,160,812 A * | 12/2000 | Bauman et al. | 370/416 |
| 6,298,061 B1 * | 10/2001 | Chin et al. | 370/400 |
| 6,950,400 B1 * | 9/2005 | Tran et al. | 370/236 |
| 7,486,617 B2 * | 2/2009 | Kokko | 370/229 |
| 7,639,699 B2 * | 12/2009 | Tallet et al. | 370/401 |
| 7,860,116 B2 * | 12/2010 | Tadimeti et al. | 370/401 |
| 7,944,913 B2 * | 5/2011 | Ogasahara | 370/386 |
| 8,462,774 B2 * | 6/2013 | Page et al. | 370/369 |
| 2004/0066746 A1 * | 4/2004 | Matsunaga | 370/235 |
| 2004/0090974 A1 * | 5/2004 | Balakrishnan et al. | 370/412 |
| 2004/0213156 A1 * | 10/2004 | Smallwood et al. | 370/232 |
| 2012/0078994 A1 * | 3/2012 | Jackowski et al. | 709/202 |
| 2013/0028080 A1 * | 1/2013 | Rao et al. | 370/230 |

OTHER PUBLICATIONS

IEEE 802.1AX (2008): IEEE Std. 802.1AX-2008: IEEE Standard for Local and metropolitan area networks—Link Aggregation.

* cited by examiner

*Primary Examiner* — Ricky Ngo
*Assistant Examiner* — Dewanda Samuel
(74) *Attorney, Agent, or Firm* — Maschoff Brennan

(57) ABSTRACT

A network element includes an ingress interface, a VSP queue, and a switch fabric (SWF). The ingress interface includes a first virtual subport (VSP) and a second VSP. The first VSP is configured to receive data traffic. The VSP queue is coupled to the second VSP such that data traffic transmitted to the VSP queue is transmitted from the network element via the second VSP. The SWF is configured to receive data traffic from the first VSP, determine whether an intended recipient of the data traffic is associated with the second VSP, and hairpin the data traffic to the VSP queue when the SWF determines that the intended recipient is associated with the second VSP.

20 Claims, 4 Drawing Sheets ced
VIRTUAL SUBPORT DATA TRAFFIC MANAGEMENT

FIELD

The embodiments discussed herein are related to managing data traffic over virtual subports (VSPs).

BACKGROUND

A communication network may include network elements that route data traffic through the communication network. Some network elements may include a distributed architecture, in which data traffic processing may be distributed among several subsystems of a given network element. Some example subsystems of the network elements may include, but are not limited to, line cards, switches, bridges, distributors, and traffic managers. Some network elements may be used in a communication network as a multifunction Ethernet aggregation network element (multifunction network element), which may support one or more functions such as link aggregation, hashing, load balancing, or some combination thereof.

The multifunction network element may include the distributed architecture including one or more line cards and/or a bridge. Each of the line cards may include a modular electronic device that may provide network communication functionality. For example, some line cards may include, among other things, an Ethernet switch that may switch traffic through the network element and into a local area network (LAN). Additionally, the line cards may include modules that may process data such as frames or packets. The packets or frames may contain information such as a source media access control (MAC) address, a destination MAC address, virtual LAN (VLAN) tags, data, or some combination thereof.

The bridge may similarly include a modular electronic device that provides network communication functionality. For example, the bridge may include, among other things, an Ethernet switch, ports, distributor, and modules to process hash rules and addresses. The modules may include processing resources and a memory configured to separate and map data received at ingress ports to output at egress ports. The data may also be flooded or multicast to all egress ports. When data is flooded, packets incoming from one source are transmitted to multiple destinations coupled to the egress ports without duplication. The destinations often share a group address so that only the devices that want the data receive it.

Additionally, communication networks may employ link aggregation. Link aggregation may generally describe the practice of using multiple network cables or ports in parallel to increase link speeds beyond the limits of any single cable or port. An example link aggregation standard is e.g., IEEE 802.1AX-2008. Link aggregation may additionally increase redundancy. In link aggregation, a group or set of ports may be combined and represented as a single logical port to other components of the network system. Various elements of the communication network system may "see" the aggregated ports known as a link aggregation group (LAG) as a single logical communication port in routing tables or databases of network elements external to the LAG.

An example communication network may include an Ethernet LAN. Generally, Ethernet LANs communicate data traffic separated into individual packets called frames that may include a source address, a destination address, and error-checking data. Ethernet LANs are, by design, a best effort system. The term "best effort" may describe systems that do not guarantee the provision of service and rather provide a capacity that is shared without restriction by users. With respect to the Ethernet LAN, best efforts may mean that network providers do not guarantee a defined bandwidth and/or amount of data traffic transfer through the LAN.

However, in some Ethernet LANs, network providers have developed a Connection Oriented Ethernet (COE). In the COE, the network providers may support a guaranteed bandwidth for certain customers, and thereby provide and maintain a quality of service (QoS). More generally, providing and/or maintaining the QoS may involve providing different priority to different customers, applications, data traffic, and/or guarantee performance to different customers, etc.

In non-bridging Ethernet LANs, to carry out the COE and provide the QoS, the network provider may provision data traffic for the certain customer on every network element. With this type of COE, the network elements may drop data traffic not recognized as provisioned by the network provider. In contrast, bridging Ethernet LANs do not require the network provider to provision each network element. Instead, the network element may learn locations of customers over time. The learning of the locations may be based on multicasting data traffic and receiving responses. However, most bridging Ethernet LANS do not provide the COE, which in turn fails to provide a QoS for customers.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a network element includes an ingress interface, a VSP queue, and a switch fabric (SWF). The ingress interface includes a first virtual subport (VSP) and a second VSP. The first VSP is configured to receive data traffic. The VSP queue is coupled to the second VSP such that data traffic transmitted to the VSP queue is transmitted from the network element via the second VSP. The SWF is configured to receive data traffic from the first VSP, determine whether an intended recipient of the data traffic is associated with the second VSP, and hairpin the data traffic to the VSP queue when the SWF determines that the intended recipient is associated with the second VSP.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
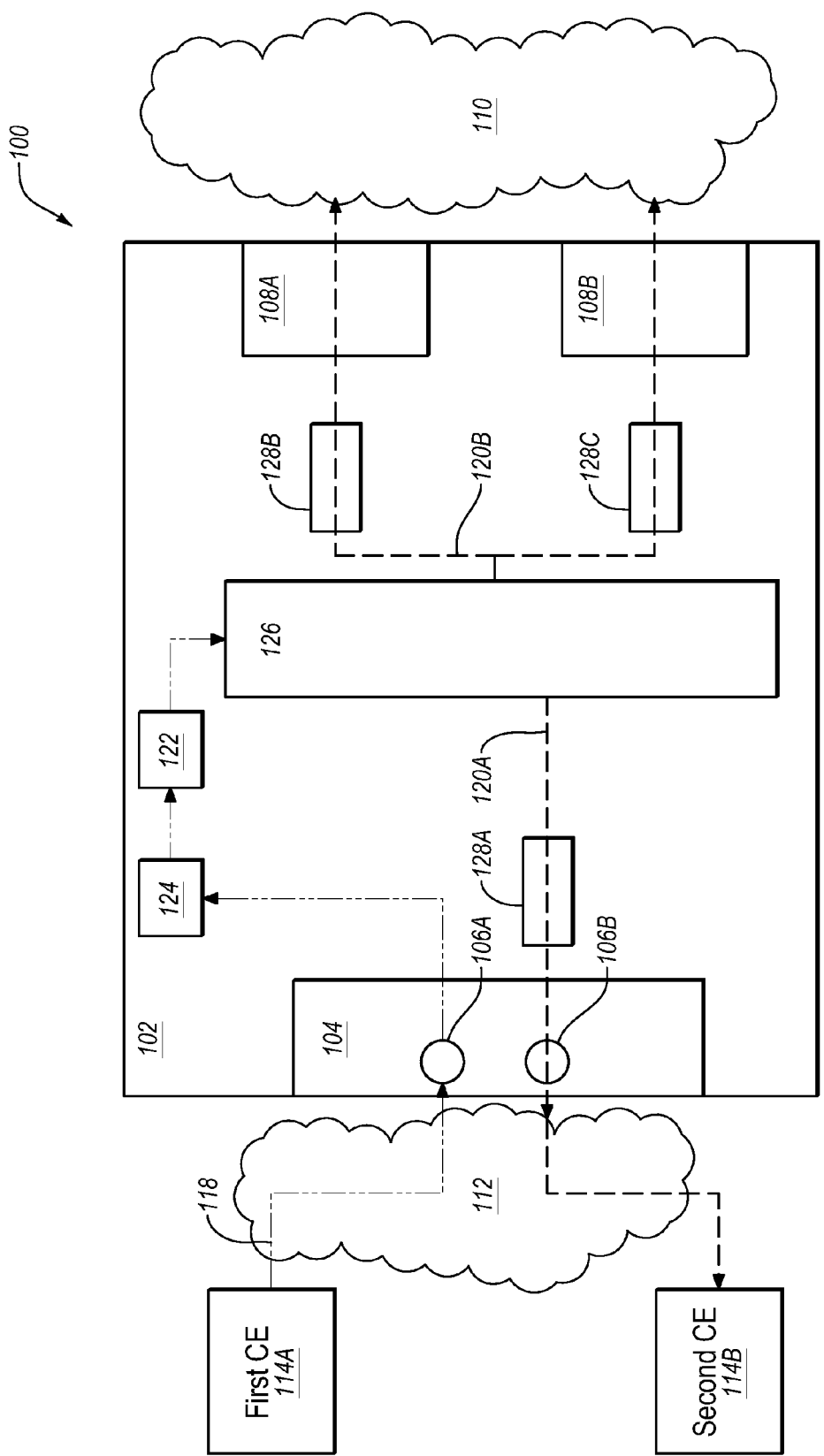
FIG. 1 illustrates a block diagram of an example network in which some embodiments may be implemented.

FIG. 1 illustrates a block diagram of an example network 100 in which some embodiments may be implemented. Generally, the network 100 may include a network element 102, which may function as an interface between an access provider network 112 and a service provider backbone 110. Thus, the network element 102 may be positioned between two provider networks. Additionally, multiple customer elements 114A and 114B (collectively, CEs 114) may be connected via the access provider network 112 to the network element 102 such that data traffic may be communicated between the CEs 114 and/or the service provider backbone 110. Additionally, the CEs 114 may be connected such that the data traffic may be communicated between the CEs 114 via the access network 112. That is, a first CE 114A may communicate data traffic to a second CE 114B and vice versa via the access network 112.

The service provider backbone 110 generally refers to primary transmission lines over which data traffic may be transmitted. In some embodiments, the service provider backbone 110 may include a connection oriented Ethernet (COE) with a bridge aggregation network. In this and other embodiments, the service provider backbone 110 may provide both COE and bridge aggregation. An example service provider backbone 110 including a COE with a bridge aggregation network is a Zayo network.

The access provider network 112 may be provided by an organization to allow the CEs 114 to access other CEs 114 and/or the service provider backbone 110. The access provider network 112 may include a COE access network. Additionally or alternatively, the access provider network 112 may include various other network elements, one or more user network interfaces (UNI) that may be remote (R-UNI), one or more network interface devices, or some combination thereof. An example of the other network elements may include a packet optical networking platform. Additionally, the CEs 114 may be variously associated with the network element 102 via the other network elements. For example the first CE 114A may be associated with the network element 102 via, for example, two other network elements while the second CE 114B may be associated with the network element 102 via, for example, one other network element.

The CEs 114 generally communicate data traffic to the network element 102. Additionally, the CEs 114 may receive data traffic from the network element 102. In the depicted embodiment, the network 100 includes two CEs 114, the first CE 114A and the second CE 114B. This depiction is not meant to be limiting. That is, the network 100 may include any number of CEs 114. In addition in the depicted embodiment, the CEs 114 are located on one side of the network element 102. However, as may be well understood, some networks 100 may include CEs 114 associated with the network element 102 through the service provider backbone 110. The CEs 114 may include any customer premises equipment including but not limited to, a telephone, a router, a switch, a residential gateway, a set-top box, or a home network adaptor.

The network 100 may include transmission media (not shown) that may connect the CEs 114, the access provider network 112, the network element 102, the service provider backbone 110, or some combination thereof. Functionally, the transmission media transport one or more signals communicated by network element 102 throughout the network 100. Accordingly, each transmission medium may include any system, device, or apparatus configured to communicatively couple the CEs 114, the access provider network 112, the network element 102, the service provider backbone 110, or some combination thereof. For example, each transmission medium may include any one or more of an optical fiber, an Ethernet cable, a Ti cable, a Wi-Fi signal, a Bluetooth signal, etc.

The network 100 communicates data, which may be referred to as traffic, data traffic, or data streams, over transmission media. As used herein, "data" means information transmitted, stored, or sorted in the network 100. The data may be transmitted over transmission media in the form of optical or electrical signals configured to represent audio, video, and/or textual data, for example. The data may also be real-time or non-real-time data. The data may be communicated via any suitable communications protocol, including, without limitation, the Open Systems Interconnection (OSI) standard and Internet Protocol (IP).

The network 100 includes the network element 102. In some embodiments, the network 100 may include multiple other network elements (not shown) that may be identical to the network element 102. Additionally, as mentioned above, the network 100 may include various other network elements connected to the network element 102 via the access provider network 112 and/or the service provider network 110.

The network element 102 may include an ingress interface 104. The ingress interface 104 may include a link aggregation group (LAG) as described with respect to FIG. 3 or a non-LAG such as a physical port as described with respect to FIG. 2. Each of the LAGs may include an M:N LAG such as a 1:1 LAG or a 0:N LAG, where N is a number from 1-8, for instance. Generally, the LAGs may include one or more physical ports that may be included in one or more line cards. The LAGs may be seen logically as the same port to an external network even in instances where physical ports are not located on the same line card.

The designation of the LAG indicates the number of physical ports included in the LAG that are either "protected" or "working." In the M:N designation included above, the "M" represents a number of physical ports that are reserved or protected. During normal operation, the protected ports do not carry data traffic. The "N" represents a number of physical ports that are working or data traffic-carrying. For example, in a 0:8 LAG, the 0:8 LAG includes eight unique physical ports that are carrying data and zero protected ports. If one of the eight ports fails, the other seven may carry the data traffic designated to the failed port. In a 1:1 LAG, one port is actively carrying data and one port is protected. If the data-carrying port fails, the data traffic may be shifted to the protected port.

The ingress interface 104 may be coupled to the access provider network 112 via one or more transmission media. The ingress interface 104 may include a first virtual subport (VSP) 106A and a second VSP 106B (collectively, VSPs 106). The VSPs 106 are logical or virtual constructs that represent some portion of the bandwidth and/or capacity of the ingress interface 104. For example, the ingress interface 104 may include a 2.0 Gigabyte per second (GB) physical port. The first VSP 106A may be provisioned at 1.2 GB and the second VSP 106B may be provisioned at 0.8 GB. The portion of the bandwidth of the ingress interface 104 may be re-provisioned periodically according to system requirements, for instance.

In this and other embodiments, the ingress interface 104 includes two VSPs 106. However, this depiction is not meant to be limiting. The network element 102 may include multiple ingress interfaces 104 any of which may include multiple VSPs 106. For example, in some embodiments the network element includes 480 ingress interfaces 104 any or all of which may include about 976 VSPs 106.

The VSPs 106 may be associated with one or more of the CEs 114. As used herein, the term "associated with" may mean the CEs 114 may transmit data traffic to the ingress interface 104, which may be processed by the network element 102 as being received at the VSPs 106 rather than at the ingress interface 104. Additionally, the term "associated with" may mean the CEs 114 may receive data traffic from the network element 102, which may be "seen" by the CE 114 as being sent from the VSP 106 rather than from the ingress interface 104. For example, in this and other embodiments, the first CE 114A may be associated with the network element 102 at the first VSP 106A and the second CE 114B may be associated with the network element 102 at the second VSP 106B. The first CE 114A "sees" the first VSP 106A as essentially an independent physical port. However, the transmission media that physically connects the first CE 114A to the ingress interface 104 does not apportion or otherwise separate the data traffic routed to the first VSP 106A. Likewise, the second CE 114B "sees" the second VSP 106B as essentially an independent physical port.

By separating an ingress interface 104 into VSPs 106, the network element 102 may provide a remote customer service interface (RCSI) to a CE 114 without allocating an entire ingress interface 104 to the CE 114. That is, with the VSPs 106, the provision of the RCSIs may not be limited to the number of ingress interfaces 104. For example, if the network element 102 includes about 24 line cards each including about 20 physical ports, the network element 102 may be limited to about 480 RCSIs. However, if each of the about 20 physical ports may be provisioned into as many as about 976 VSPs, the network element 102 may provide as many as about 46080 RCSIs.

Additionally, the provisioned portions of each ingress interface 104 may be variable. For example, the network element 102 may include about 24 line cards each including about 20-10 GB physical ports. In this and other embodiments, the network element 102 may be limited to about 480 COE interfaces each of which includes a 10 GB bandwidth. However, if each of the about 20 physical ports may be provisioned into as many as about 976 VSPs, each of the VSPs may be provisioned any portion of the 10 GB bandwidth. That is, the first VSP of the first physical port may include 1 GB of bandwidth, while the second VSP on the first physical port may include 9 GB of bandwidth. The overall amount of data traffic the network element 102 may receive may be the same regardless of the number of VSPs 106.

The general flow of data traffic through the network element 102 may include inbound traffic 118 and outbound traffic 120a and 120b (collectively, outbound traffic 120). The inbound traffic 118 may be communicated by the first CE 114A through the access provider network 112 where it may be received at the first VSP 106A included in the ingress interface 104.

The inbound traffic 118 may proceed through a classifier (not shown) that may classify the data traffic received at the ingress interface 104. In some embodiments, the classifier may classify the data traffic based on an identifier. The identifier may be a series or set of bits included in the data traffic. For example, the data traffic may be structured as packets including control information and data. The control information may include the series or set of bits from which a classification may be based.

In some embodiments, the classifier may classify the data stream as VSP traffic or non-VSP traffic. Additionally or alternatively, the classifier may determine a priority of the data traffic. Based on the priority and/or the classification, the data traffic may be treated differently. Additionally, the priority and/or the classification may provide a basis for maintaining a particular quality of service (QoS).

For example, the classifier may determine that the data traffic includes high priority data and low priority data. The high priority data traffic may be from a CE 114 with a committed information rate (CIR), for instance. The low priority data may be general internet traffic, for instance. The network element 102 may accordingly prioritize the transmission of the high priority data over the low priority data, thereby maintaining the QoS of the CE 114 in accordance with the CIR.

The inbound traffic 118 may additionally proceed through a call admission control (CAC) (not shown), a rate limiter 124, a policer 122, or some combination thereof. The function of the CAC, the rate limiter 124, and the policer 122 may vary with respect to the type of ingress interface 104. Additional details regarding aspects of each of the CAC, the policer 122, and the rate limiter 124 in embodiments in which the ingress interface 104 is a non-LAG, a 1:1 LAG, and a 0:N LAG are provided below.

The inbound traffic 118 may proceed through the CAC, which may prevent oversubscription of a voice over IP (VOIP) network and may ensure there is adequate bandwidth for an authorized flow. In embodiments in which the ingress interface 104 is a 0:N LAG the CAC may be omitted. However, in embodiments in which the ingress interface 104 is a non-LAG or a 1:1 LAG, the CAC may operate based on sums of CIR of provisioned data profiles. Additionally, in some embodiments, the CAC may be applied to inbound traffic 118 and/or outbound traffic 120. The CAC applied to inbound traffic 118 may be different from that applied to outbound traffic 120. The inbound traffic 118 may additionally proceed through a rate limiter 124. The rate limiter 124 may prevent congestion caused by multicast traffic included in the data traffic. More specifically, the data traffic may include unknown unicast traffic and multicast traffic. Accordingly, the rate limiter 124 may include one or more rate limit meters that may throttle or delay the unknown unicast traffic and multicast traffic according to a rate limiting profile. In some embodiments in which the ingress interface 104 is a non-LAG, the rate limiter 124 may include one or more provisionable rate limiting profiles that may throttle frames of data traffic with unknown unicast or multicast media access control (MAC) addresses. Likewise, in some embodiments in which the ingress interface 104 is a 1:1 LAG, the rate limiter 124 may include one or more provisionable rate limiting profiles that may throttle frames with unknown unicast or multicast media access control (MAC) addresses. Inclusion of the provisionable rate limiting profiles may result in one rate limit meter each on a LAG port and on a protection LAG port for the VSP. In some embodiments in which the ingress interface 104 is a 0:N LAG, the rate limiter 124 may be designed to limit the maximum multicast traffic rate from each LAG port.

The inbound traffic 118 may additionally proceed through the policer 122. The policer 122 may mark and/or drop the packets of data traffic received at the first VSP 106A in excess of a committed traffic rate. For example, if the first CE 114A has a RCSI including a given quantity of committed traffic rate such as 10 GB, the policer 122 may mark and/or drop all data traffic from the first CE 114A above 10 GB. In some embodiments, the policer 122 may rely on or work in accordance with the classifier. That is, the classifier may determine the classification and/or the priority of the data traffic. Based on the classification and/or the priority of the data traffic the policer 122 may determine whether to drop and/or mark packets of the data traffic. In some embodiments in which the ingress interface 104 is a non-LAG or a 1:1 LAG, the VSPs 106 may include a user provisioned policing profile or may apply a default policing profile based on data contained in the data traffic. In some embodiments in which the ingress interface 104 is a 0:N LAG, the policer 122 may be omitted.

As depicted in FIG. 1 the inbound traffic 118 may proceed through the rate limiter 124 then the policer 122. However, in some embodiments, the policer 122 may be in front of the rate limiter 124. Alternatively still, the policer 122 and/or the rate limiter 124 may be omitted.

The inbound traffic 118 may additionally proceed through a switch fabric (SWF) 126. Generally, the SWF 126 receives the data traffic, determines an intended recipient of the data traffic, and transmits the data traffic such that the data traffic may ultimately reach the intended recipient. Thus, at the SWF 126 the inbound traffic 118 becomes the outbound traffic 120A or 120B.

In the depicted embodiment, there are two outbound traffic examples 120A and 120B. Outbound traffic 120A represents data traffic hairpinned through the second VSP 106B to reach a corresponding intended recipient. Hairpinning, or variations thereof as used herein relate to transmitting data traffic received on an ingress interface back to the ingress interface. More specifically, hairpinning relates to data traffic received on one VSP included in the ingress interface, which is then transmitted to another VSP of the same ingress interface. Conversely, outbound traffic 120B represents data traffic transmitted through one of the egress interfaces 108A or 108B to a corresponding intended recipient.

Each of the egress interfaces 108A and 108B (collectively, egress interfaces 108) and the second VSP 106B may be coupled to a queue 128A-128C (collectively, queue 128). Specifically, the second VSP 106B may be coupled to a VSP queue 128A, and the egress interfaces 108A and 108B may be respectively coupled to the first egress queue 128B and the second egress queue 128C. The coupling may be such that the data traffic transmitted to the queue 128 by the SWF 126 is transmitted from the network element 102 via a corresponding component coupled to the queue 128 (e.g., the egress interfaces 108A and 108B and the second VSP 106B). For example, the SWF 126 may transmit data traffic to the VSP queue 128A. The data traffic may then be transmitted from the network element 102 via the second VSP 106B.

The queues 128 may be independent. That is, the first egress queue 128B may not be related to and/or may not communicate with the second egress queue 128C, for instance. The queues 128 may be located at each egress (e.g., the second VSP and the egress interfaces 108A and 108B). For example, the VSP queue 128A may be located at the second VSP 106B.

In this and other embodiments, the queues 128 include one VSP queue 128A, and two egress queues 128B and 128C. However, this depiction is not meant to be limiting. The network element 102 may include any number of queues 128. In some embodiments, the network element 102 may include one queue 128 for each VSP 106 and one queue 128 for each egress interface 108. For example, the network element 102 may include multiple ingress interfaces 104 and multiple egress interfaces 108. In this and other embodiments, each ingress interface 104 may include multiple VSPs 106 and multiple queues 128. Each of the queues 128 may be coupled to a respective one of the VSPs 106 or egress interfaces 108.

The SWF 126 may determine to which of the queues 128 to transmit the data traffic by determining a location of the intended recipient of the data stream. The determination may be based on an identifier such as the identifier described above. The identifier may include a queue identifier that specifies to which of the queues 128 the intended recipient is connected. The queue identifier may be included in, as a portion of, or separate from the identifier used for classification and/or prioritization.

For example, the SWF 126 may determine that an intended recipient of data traffic is associated with the second VSP 106B. That is, the SWF 126 may determine that the intended recipient is the second CE 114B. When the SWF 126 determines that the intended recipient is associated with the second VSP, the SWF 126 may be configured to hairpin the data traffic to the VSP queue 128A. The data traffic may then be transmitted from the VSP queue 128 through the second VSP 106B, through the access provider network 112, and may be received by the second CE 114B, for instance.

Figure 2:
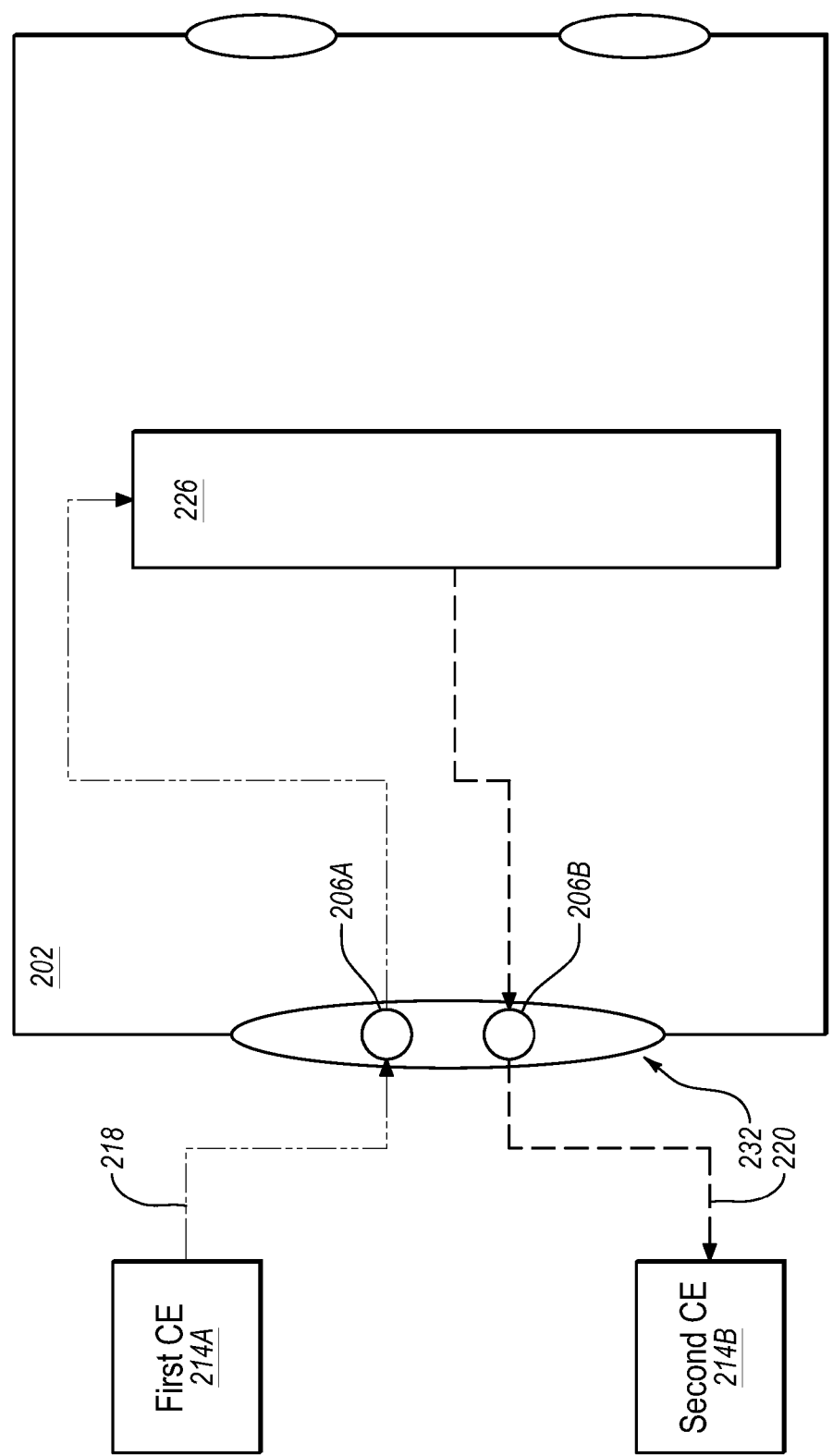
FIG. 2 illustrates an example network element that includes an ingress interface that is a physical port and that may be implemented in the network of FIG. 1.

FIG. 2 illustrates an example network element 202 that includes an ingress interface that is a physical port 232 and that may be implemented in the network 100 of FIG. 1. For simplicity, in FIG. 2, various components that were illustrated in FIG. 1, such as an access provider network, a service provider backbone, a policer, queues, etc., have been omitted. However, all or some portion of the components, systems, and functionality of the network 100 in FIG. 1 may be incorporated into the embodiment depicted in FIG. 2. Thus, the network element 202 of FIG. 2 may correspond to the network element 102 of FIG. 1.

In this and other embodiments, inbound traffic 218 may be sent by a first CE 214A through a first VSP 206A which may then proceed to a SWF 226. The SWF 226 may determine that the intended recipient is a second CE 214B. Accordingly, the SWF 226 may hairpin the data traffic as outbound traffic 220 to a second VSP 206B and then on to the second CE 214B.

Thus, in this and other embodiments, the data traffic may be received at the ingress interface, which is a single physical port 232, and then hairpin out or return through the same physical port 232 through which the data traffic was received. The VSPs 206A and 206B enable the data traffic to hairpin through the single physical port 232.

Figure 3:
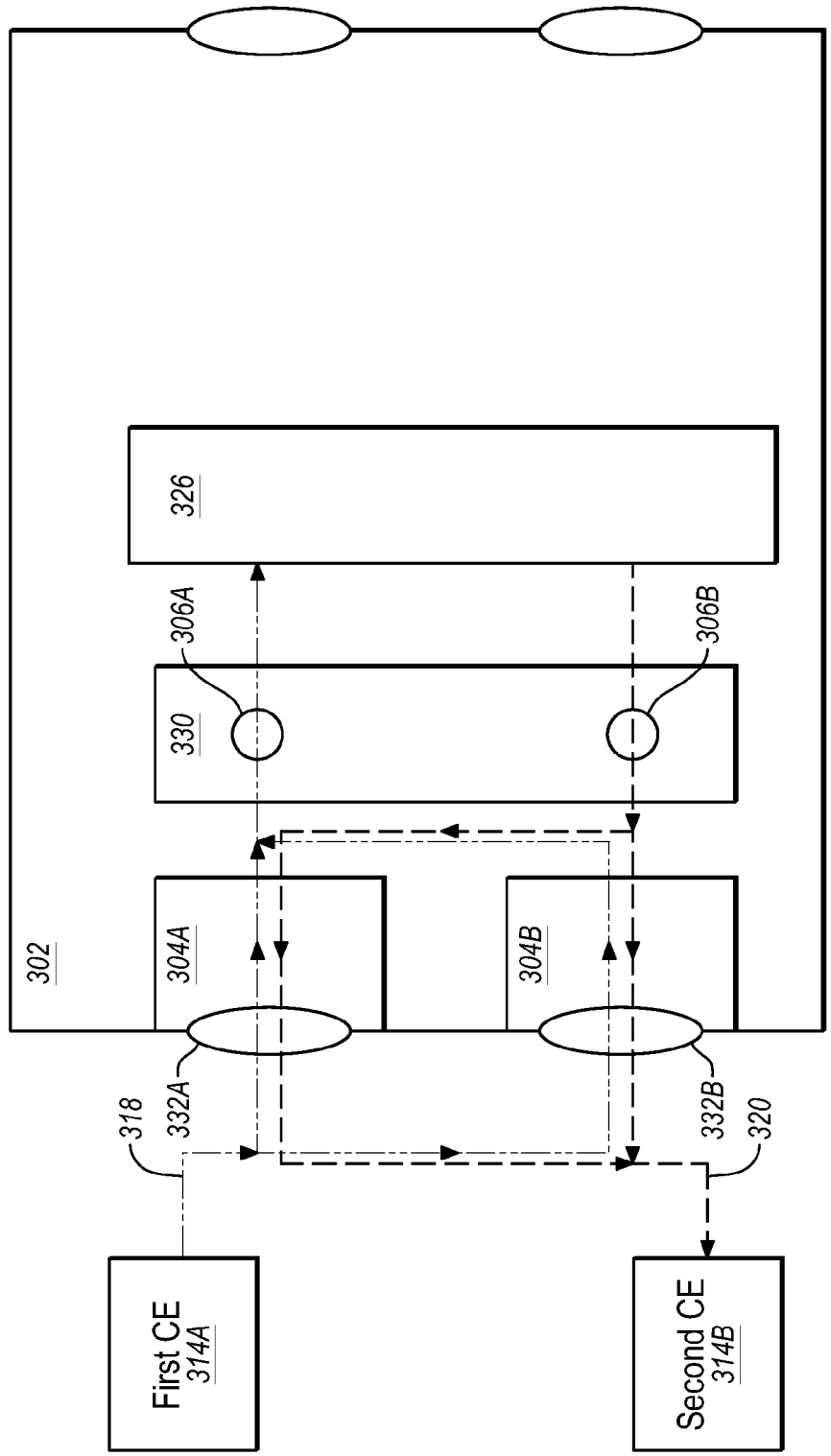
FIG. 3 illustrates an example network element that includes an ingress interface that is a link aggregation group (LAG) and that may be implemented in the network of FIG. 1.

FIG. 3 illustrates an example network element 302 that includes an ingress interface that is a LAG 330 and that may be implemented in the network of FIG. 1. In FIG. 3 a 0:N LAG is depicted in which "N" is a whole, positive number. Specifically, in FIG. 3 a 0:2 LAG is depicted. However, this depiction is not limiting. The ingress interface may also include a 1:1 LAG or a 0:N LAG with N being another number. For simplicity, in FIG. 3, various components that were illustrated in FIG. 1, such as an access provider network, a service provider backbone, a policer, queues, etc. have been omitted. However, all or some portion of the components, systems, and functionality of the network 100 in FIG. 1 may be incorporated into the embodiment depicted in FIG. 3. Thus, the network element 302 of FIG. 3 may correspond to the network element 102 of FIG. 1.

The LAG 330 may be a group of physical ingress ports 332A and 332B which is "seen" as a single port by a first CE 314A, for instance. The physical ingress ports 332A and 332B included in the LAG 330 may be included on one or more ingress line cards 304A and 304B of the network element 302. However, the LAG 330 additionally includes VSPs 306A and 306B, which may additionally be "seen" as a physical port. That is, the LAG 330 may be "seen" as a single port and one of VSPs 306A and 306B may also be "seen" as a single port on the LAG 330.

For example, the first CE 314A "sees" a single physical port (CE-seen physical port) and transmits inbound traffic 318 to the CE-seen physical port. However, the CE-seen physical port is the first VSP 306A on the LAG 330 and includes the two physical ports 332A and 332B on the network element 302. The inbound traffic 318 transmitted by the first CE 314A may be transmitted through the first physical port 332A and/or the second physical port 332B.

Additionally, a second CE 314B may be associated with the second VSP 306B. Like the first VSP 306A, the second VSP 306 may be included on the LAG 330 that includes the two physical ports 332A and 332B. Thus, outbound traffic 320 that may be hairpinned by a SWF 326 to the second CE 314B may be transmitted from the second VSP 306B and through the first physical port 332A and/or the second physical port 332B.

Thus, in this and other embodiments, the inbound traffic 318 may be sent by the first CE 314A through a first physical port 332A and/or a second physical port 332B to the network element 302. The first CE 314A "sees" the first physical port 332A and/or the second physical port 332B as an equivalent destination, i.e., the first VSP 306A of the LAG 330. The inbound traffic 318 may then proceed to the SWF 326. The SWF 326 may determine that the intended recipient is the second CE 314B. Accordingly, the SWF 326 may hairpin the data traffic as outbound traffic 320 to the second VSP 306B which may then transmit the outbound traffic 320 to the second CE 314B through the first physical port 332A and/or the second physical port 332B. Consequently, in this and other embodiments, data traffic may be received at the ingress interface from the first CE 314A, which is the LAG 330 and then hairpin out or return through the same LAG 330 to the second CE 314B.

Referring back to FIG. 1, the SWF 126 may determine that the intended recipient of the data traffic is associated with one of the egress interfaces 108A or 108B. Accordingly, the SWF 126 may transmit the data traffic to the first egress queue 128B or the second egress queue 128C when the SWF 126 determines the intended recipient is associated with one of the egress interfaces 108A or 108B. The data traffic may then be transmitted from the network element 102 via one of the egress interfaces 108A or 108B, which may then pass through the service provider backbone 110 and to the intended recipient. While the transmission of the data traffic to the egress interfaces 108B and 108A is described with respect to FIG. 1, an equivalent or similar transmission may occur in the embodiments depicted in FIGS. 2 and 3.

The egress interfaces 108A and 108B may include physical ports or may include LAGs, or the like or any combination thereof. In some embodiments in which the egress interfaces 108A and 108B include LAGs, the LAGs may include physical ports on one or more line cards, for instance.

In some embodiments, the network element 102 does not include the SWF 126. Instead, the network element 120 may include a distributor or some combination of equivalent components that may include hardware components, software components, logic, memory, or some combination thereof to perform the above-described functions.

In some embodiments, the queues 128 may be integral with schedulers (not shown). The schedulers may apply one or more algorithms that determine an order, a sequence, a priority, or some combination thereof at which the data traffic moves through the queues 128.

Figure 4:
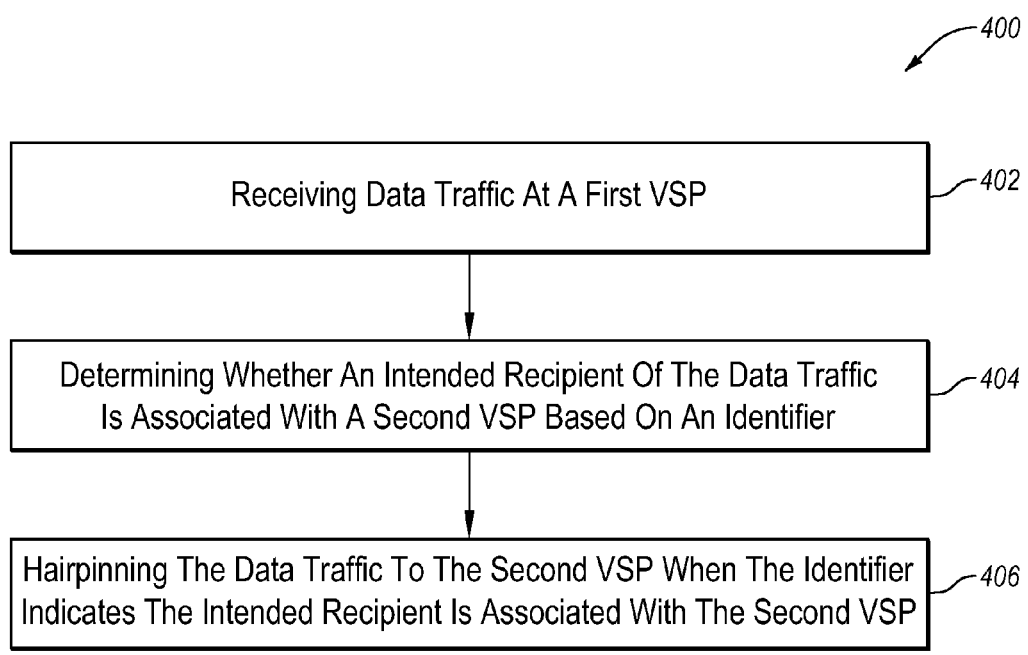
FIG. 4 is a flow diagram of an example method for virtual subport (VSP) traffic management.

FIG. 4 is a flow diagram of an example method 400 for VSP traffic management. The method 400 may begin at 402 by receiving data traffic at a first VSP. The data traffic may include unknown unicast data, multicast data, VSP data, non-VSP data, or some combination thereof. The first VSP may be included in an ingress interface of a network element. Specifically, the first VSP may include a provisioned portion of the ingress interface. The ingress interface may be provisioned between at least a first VSP and a second VSP. The ingress interface may include a physical port, a 0:N LAG, or a 1:1 LAG. Additionally, the ingress interface provisioned between the first VSP and the second VSP may be variable.

In some embodiments, the data traffic may be classified according to an identifier. The identifier may be a series or set of bits included in the data traffic. Additionally, in some embodiments, the identifier may indicate whether the data traffic is VSP data or non-VSP data.

In some embodiments, the data traffic may be prioritized according to a committed information rate (CIR). The CIR may be according to a contract or another agreement between a network provider and one or more customers and/or another network provider. The prioritization may include high priority data and low priority data. Alternatively, the prioritization may include any number of levels of priority.

Additionally, in some embodiments, based on the prioritization, a quality of service (QoS) may be maintained. In some embodiments, the QoS may include granting or providing priority treatment to high priority data, for instance.

In some embodiments, the rate of the data traffic may be limited by a rate limiter. Generally, the rate limiter may be applied to the data traffic as inbound traffic to the network element. The rate limiting may include throttling or delaying inbound traffic. The rate limiting may vary based on whether the ingress interface is a non-LAG, a 1:1 LAG, or a 0:N LAG.

Additionally or alternatively, in some embodiments, the inbound traffic may be policed. Policing the inbound traffic may generally include marking or dropping inbound traffic above a committed traffic rate. The policing may vary based on whether the ingress interface is a non-LAG, a 1:1 LAG, or a 0:N LAG.

Returning to FIG. 4, at 404, the method 400 may include determining whether an intended recipient of the data traffic is associated with the second VSP based on the identifier. As already mentioned above, the identifier may include information used in classification and/or prioritization. Additionally, the identifier may include information used to determine the intended recipient of the data traffic. The determination may be made by a SWF.

Additionally, in some embodiments, when the SWF determines that the intended recipient is not associated with the second VSP, the SWF or another component may determine whether the intended recipient of the data traffic is associated with an egress interface based on the identifier.

At 406, the method 400 may include hairpinning the data traffic to the second VSP when the identifier indicates the intended recipient is associated with the second VSP. In some embodiments in which the ingress interface is a physical port, the hairpinning may occur on the same physical port. In some embodiments in which the ingress interface is a LAG, the hairpinning may occur between VSPs on the same LAG.

Additionally, in some embodiments, the data traffic may be transmitted to an egress interface when the identifier indicates the intended recipient is associated with the egress interface. The egress interface may include one or more physical ports or may include a LAG that includes multiple ports, which may be included in multiple line cards. The data traffic transmitted to the egress interface and/or the second VSP may be described as outbound traffic.

In some embodiments, the outbound traffic may be scheduled. Scheduling outbound traffic may include applying one or more algorithms that determine an order, a sequence, a priority, or some combination thereof at which the data traffic moves through one or more queues.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code means in the form of computer-executable instructions or data structures and which may be accessed by a general purpose or special purpose computer. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A network element comprising:
    an ingress interface including:
        a first virtual subport (VSP) configured to receive data traffic, and
        a second VSP;
    a VSP queue coupled to the second VSP such that data traffic transmitted to the VSP queue is transmitted from the network element via the second VSP;
    a policer configured to mark or drop any data traffic received at the first VSP in excess of a committed traffic rate;
    a rate limiter configured to prevent congestion caused by multicast traffic included in the data traffic; and
    a switch fabric (SWF) configured to:
        receive data traffic from the first VSP,
        determine whether an intended recipient of the data traffic is associated with the second VSP, and
        hairpin the data traffic to the VSP queue when the SWF determines that the intended recipient is associated with the second VSP.

2. The network element of claim 1, further comprising an egress interface queue coupled to an egress interface such that data traffic transmitted to the egress interface queue is transmitted from the network element via the egress interface; and wherein the SWF is further configured to:
    when the SWF determines that the intended recipient is not associated with the second VSP, determine whether the intended recipient of the data traffic is associated with the egress interface, and
    transmit the data traffic to the egress queue when the SWF determines that the intended recipient is associated with the egress interface.

3. The network element of claim 1, further a comprising a scheduler configured to bring the data traffic into conformity with a traffic profile.

4. The network element of claim 1, wherein the ingress interface comprises a link aggregation group (LAG).

5. The network element of claim 4, wherein the LAG comprises a 1:1 LAG or a 0:N LAG.

6. The network element of claim 1, wherein the ingress interface comprises a physical port.

7. The network element of claim 1, wherein the data traffic includes VSP traffic and non-VSP traffic.

8. The network element of claim 7, further comprising a classifier configured to classify the data traffic as VSP traffic or non-VSP traffic.

9. A method of virtual subport (VSP) traffic management comprising:
    receiving data traffic at a first VSP included in an ingress interface of a network element;
    rate limiting multicast traffic included in the data traffic;
    marking or dropping a portion of the data traffic received at the first VSP in excess of a committed traffic rate;
    determining whether an intended recipient of the data traffic is associated with a second VSP included in the ingress interface based on an identifier; and
    hairpinning the data traffic to the second VSP when the identifier indicates that the intended recipient is associated with the second VSP.

10. The method of claim 9, further comprising classifying the data traffic according to the identifier.

11. The method of claim 10, further comprising prioritizing the data traffic according to a committed interface rate (CIR).

12. The method of claim 11, further comprising maintaining a quality of service (QoS) based on the prioritization.

13. The network element of claim 9, wherein the identifier comprises a queue identifier.

14. The method of claim 9, further comprising:
    when the identifier does not indicate that the intended recipient is associated with the second VSP, determining whether the intended recipient of the data traffic is associated with an egress interface based on the identifier; and transmitting the data traffic to an egress interface when the identifier indicates the intended recipient is associated with the egress interface.

15. The method of claim 9, further comprising provisioning the ingress interface between at least the first VSP and the second VSP.

16. The method of claim 9, further comprising routing received data traffic through a Call Admission Control (CAC) to prevent oversubscription of a voice over IP (VoIP) network and ensure adequate bandwidth for an authorized flow.

17. A system comprising:
a network element including:
an ingress interface including:
a first virtual subport (VSP) configured to receive data traffic, and
a second VSP;
a VSP queue coupled to the second VSP such that data traffic transmitted to the VSP queue is transmitted from the network element via the second VSP;
a policer configured to mark or drop any data traffic received at the first VSP in excess of a committed traffic rate;
a rate limiter configured to prevent congestion caused by multicast traffic included in the data traffic; and
a switch fabric (SWF) configured to:
receive data traffic from the first VSP,
determine whether an intended recipient of the data traffic is associated with the second VSP, and
transmit the data traffic to the VSP queue when the SWF determines that the intended recipient is associated with the second VSP;
a first customer element (CE) associated with the network element at the first VSP; and
a second CE associated with the network element at the second VSP.

18. The system of claim 17, further comprising a service provider backbone network associated with an egress interface, and wherein:
the first CE is associated with the network element at the first VSP via an access provider network; and
the second CE is associated with the network element at the second VSP via the access provider network.

19. The system of claim 17, wherein the network element further comprises an egress interface queue coupled to an egress interface such that data traffic transmitted to the egress interface queue is transmitted from the network element via the egress interface; and wherein the SWF is further configured to:
when the SWF determines that the intended recipient is not associated with the second VSP, determine whether the intended recipient of the data traffic is associated with the egress interface, and
transmit the data traffic to the egress queue when the SWF determines that the intended recipient is associated with the egress interface.

20. The system of claim 17, wherein the ingress interface includes a physical port or a link aggregation group (LAG).

* * * * *